United States Patent [19]
Phillips et al.

[11] 3,818,875
[45] June 25, 1974

[54] POLLUTION-FREE COMBUSTION ENGINE AND UNIQUE FUEL THEREFOR

[76] Inventors: Edward H. Phillips, 30 King George Rd., Warren; Edwin D. Phillips, 170 Albert St., North Plainfield, both of N.J. 07060

[22] Filed: Nov. 30, 1972

[21] Appl. No.: 310,987

[52] U.S. Cl. ............... 123/25 E, 60/39.46, 123/1 A, 123/24 R
[51] Int. Cl. ........................ F02b 1/00, F02b 51/00
[58] Field of Search ....... 60/39.02, 39.46, 221, 227, 60/26, 35.5; 123/23, 24 R, 1 A, 1, 25 E, 119 E

[56] References Cited
UNITED STATES PATENTS
3,595,022 7/1971 Radebold et al................... 60/39.46

Primary Examiner—Charles J. Myhre
Assistant Examiner—Tony Argenbright
Attorney, Agent, or Firm—Shoemaker and Mattare

[57] ABSTRACT

A pollution-free combustion engine and method of operating same, and a unique fuel, in which the working fluid for the engine is a liquid alkali metal reacted with water, the reacted alkali metal and water producing hydrogen, an hydroxide of the alkali metal, and heat, at least a portion of the hydroxide being exhausted to atmosphere where it reacts with carbon monoxide to produce a harmless carbonate, said fuel thus resulting in a nonpolluting engine.

13 Claims, 6 Drawing Figures

POLLUTION-FREE COMBUSTION ENGINE AND UNIQUE FUEL THEREFOR

BACKGROUND OF THE INVENTION

One of the major contributors to air pollution is the automotive internal combustion engine and in recent years a great amount of effort and money has been spent in trying to design either a pollution free engine or an engine which does not pollute the atmosphere to the same extent as presently widely used internal combustion engines produce. In an effort to reduce the pollution caused by the automobile engine, various anti-smog devices, such as catalytic burners and the like have been devised and installed on automobiles; however, such devices are relatively complicated and expensive and reduce the performance of the automobile while not substantially reducing the pollutants emitted by the automobile engine. Other attempts have been with electric or steam engines or with new fuels which do not emit as many hydrocarbons or poisonous products into the atmosphere when burned as do conventional fuels.

While each of these approaches reduces the amount of pollutants discharged into the atmosphere, they each have one or more other serious disadvantages, such as, complexity and expense in design and manufacture, loss of performance, and the necessity of substantial modification to existing engines and manufacturing facilities.

The present invention provides a pollution free combustion engine which uses a liquid alkali metal reacted with water as the working fluid therefor, the alkali metal and water resulting in the engine being pollution free.

In the present invention, an engine is provided with a reaction chamber, and a measured amount of liquid alkali metal is injected into the reaction chamber along with a measured amount of water. The water and liquid alkali metal react violently in the reaction chamber, driving the prime mover of the engine. The reaction of the liquid alkali metal and water produces hydrogen which is ignited by the temperature obtained in the reaction chamber, thus increasing the work produced by the engine. Further, the products of the reaction are steam vapor or water vapor and an hydroxide of the alkali metal. The hydroxide when discharged to atmosphere, reacts with any carbon monoxide present in the atmosphere to produce a harmless carbonate. Thus, not only does the engine emit pollutionless by-products, but the by-products emitted thereby react with pollutants already in the air to reduce them to harmless substances. Moreover, the hydroxide of the liquid alkali metal exhausted from the reaction chamber can be cycled through the engine to serve as a lubricant therefor, if desired. Examples of some alkali metals which can be satisfactorily used in an engine as contemplated by the invention are: sodium, lithium and potassium. Sodium is the preferred alkali metal since it reacts more violently than either lithium or potassium and is readily available at a low cost. For example, sodium can be obtained for approximately $0.15 a pound, and substantially less than one gram of the alkali metal is injected into the reaction chamber in each cycle of operation.

In the present invention, the alkali metal is maintained as a liquid by the use of heaters in order to simplify handling of the alkali metal and its injection into the reaction chamber in controlled amounts.

OBJECTS OF THE INVENTION

It is an object of this invention to provide a combustion engine which runs on hydrogen, the hydrogen being obtained from water reacted with an alkali metal, thus rendering the engine pollution free.

Another object of the invention is to provide a combustion engine which is pollution free and in which a liquid alkali metal is reacted with water to produce a working fluid for the engine, the working fluid being non-polluting.

A further object of the invention is to provide a method of operating a pollution free combustion engine wherein a liquid alkali metal and water are reacted in a reaction chamber of the engine to produce an hydroxide, of the alkali metal, hydrogen and water vapor, the hydrogen being ignited by the temperature produced in the reaction chamber and thus increasing the work on the prime mover of the engine, at least a portion of the hydroxide of the alkali metal being exhausted to atmosphere where it reacts with carbon monoxide present in the atmosphere to produce a harmless carbonate.

DETAILED DESCRIPTION OF THE INVENTION

Figure 1:
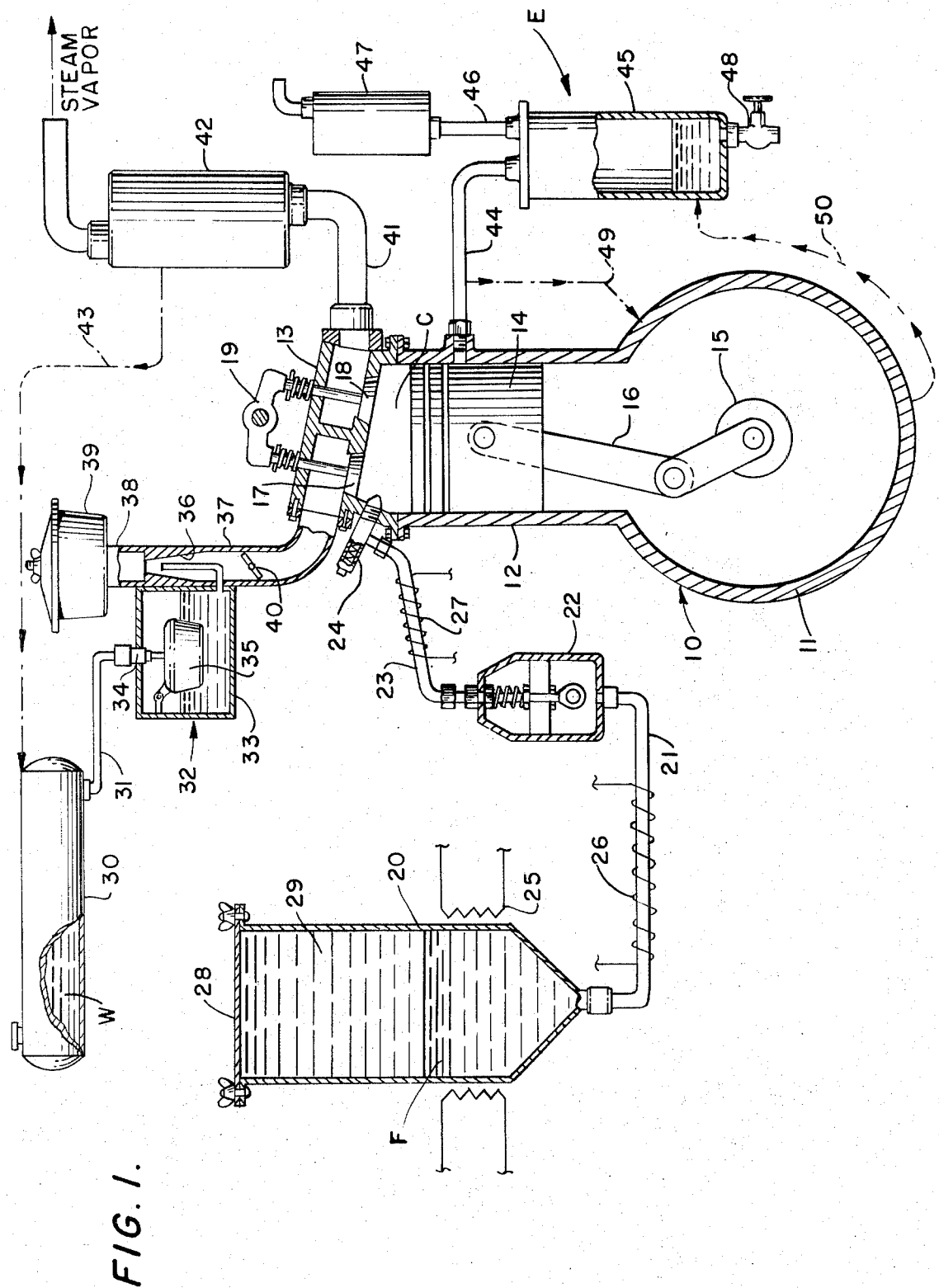
FIG. 1 is a schematic illustration of the engine and various accessories therefor in accordance with the invention with portions broken away to show internal parts of the engine.

Referring to the drawings, wherein like reference numerals indicate like parts throughout the several views, a pollution free combustion engine and various accessory devices therefor, are indicated generally at E in FIG. 1. The engine comprises a housing 10 having a crank case 11 and cylinder 12. A cylinder head 13 is secured on the cylinder 12 and a piston 14 is mounted for reciprocation in the cylinder 12 and is connected with a crank 15 in the crank case 11 by means of a connecting rod 16 extending between the crank and piston 14.

The aforedescribed structure is of substantially conventional construction with the metal selected for the various parts of the engine being compatible wth the alkali metal used as a fuel. Cast iron is an example of a metal which is compatible with sodium, for example.

Substantially conventional intake valves 17, and exhaust valves 18 are mounted in the head 13 for controlling the intake and exhaust of materials to and from a reaction chamber C in the cylinder 12, and the valves are controlled by substantially conventional rocker arms 19 secured externally of the head.

A reservoir or tank 20 containing a liquid alkali metal as a fuel F is connected with the reaction chamber C of the engine through a first conduit 21, an injection pump 22, a second conduit 23 and a fuel injection nozzle 24 mounted in the head 13 of the engine. Suitable heaters 25, 26 and 27 are disposed adjacent the fuel tank 20 and conduits 21 and 23 for maintaining the alkali metal fuel F in a liquid state. For example, if the alkali metal comprises sodium, the heaters should be capable of maintaining it at a temperature of approximately 200° F. to keep it in liquid form.

As illustrated, a removable top cover 28 is provided on the tank 20 for enabling replenishing of the supply of fuel F therein; and if desired, a liquid hydrocarbon 29 may be placed over the liquid alkali fuel F to maintain pressure on the fuel F to ensure it being fed through the injection nozzle into the reaction chamber C.

A second reservoir or tank 30 containing water W as an oxidizer for the alkali metal fuel F is connected through a conduit 31 with a carburetor 32 having a float chamber 33 with an inlet 34 thereto controlled by a float 35 in a conventional manner. The float chamber 33 is in communication with a venturi 36 of the carburetor for drawing water from the float chamber into the throat of the carburetor and thus through the intake manifold 37 through the inlet valve 17 into the reaction chamber C. An air inlet 38 having an air cleaning element 39 thereon is provided on the carburetor 32 for admitting air to the engine. The carburetor is controlled with a butterfly valve 40 in a conventional manner.

An exhaust manifold 41 is also connected with the head 13 for conducting exhaust from the reaction chamber C, and the manifold is connected with a suitable muffler 42. The major substance exhausted through the manifold and muffler comprises steam, and a conduit 43 may be provided, if desired, connected between the muffler and tank 30 for recycling condensed steam as water back into the reservoir.

A second outlet 44 from the cylinder 12 is provided in the side of the cylinder between the top and bottom thereof for exhausting the hydroxide of the reacted alkali metal from the reaction chamber C. The conduit 44 is connected with a storage tank 45 for the hydroxide and a vent or exhaust 46 is connected with the tank 45 into a muffler 47 for venting the hydroxide of the alkali metal to atmosphere. A drain valve 48 is provided in the bottom of the tank 45 for removing liquid hydroxide from the tank. If desired, a conduit 49 may be connected between the exhaust line 44 and crank case 11 for conveying liquid hydroxide into the crank case for lubricating the engine, and a return line 50 may be connected between the crank case and tank 45 for continuous cycling of hydroxide solution into and out of the crank case for lubricating the engine.

In FIGS. 2 through 5, a cycle of operation of the engine is depicted.

Figure 2:
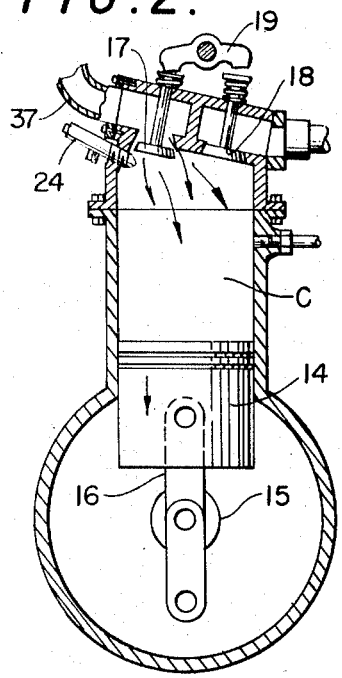
FIGS. 2, 3, 4 and 5 are schematic views of a portion of the engine of FIG. 1, showing it in different stages of a cycle of operation of the engine.

In FIG. 2, the piston 14 is at bottom dead center, and the intake valve 17 is opened, the exhaust valve 18 is closed, and a charge of air and water droplets are being drawn into the chamber C from the intake manifold 37.

Figure 3:
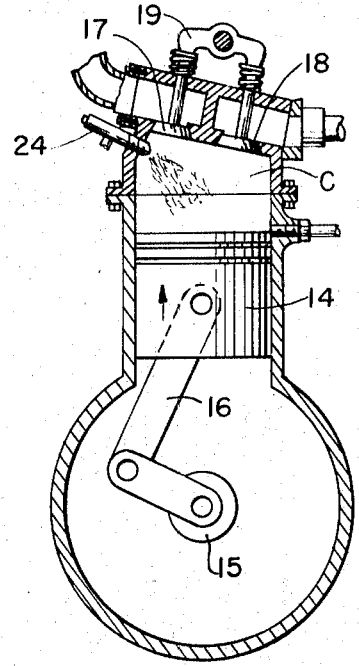

In FIG. 3, the piston 14 is coming upwardly on a compression stroke with both the intake and exhaust valves closed and a charge of liquid alkali metal such as sodium, lithium and potassium or the like is being injected into the chamber C through the injection nozzle 24.

Figure 4:
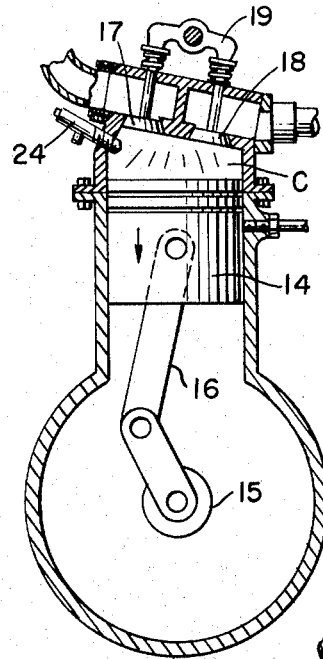

In FIG. 4, the piston 14 is just beginning its downward power stroke with both the intake and exhaust valves closed, and the water and liquid alkali metal have reacted violently, causing an explosion in the chamber C to drive the piston downwardly. The temperature obtained in the chamber at this time is on the order of 5,000° F., and the hydrogen produced as a result of the reaction of the water and alkali metal is this ignited, further increasing the work performed on the piston 14.

Figure 5:
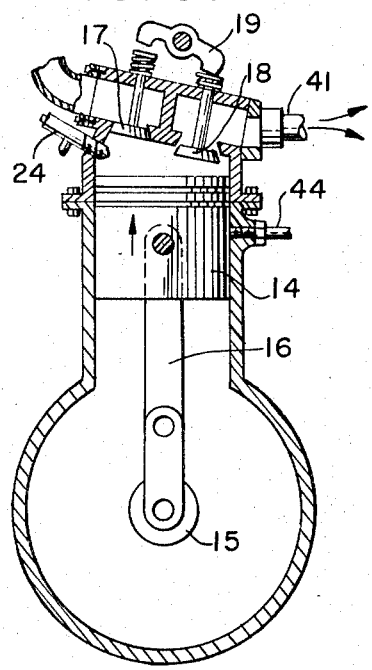

In FIG. 5, the piston has moved upwardly and the exhaust valve 18 is opened with the steam remaining in the chamber being exhausted through the exhaust manifold 41. The hydroxide of the alkali metal is exhausted through conduit 44 when the piston moves downwardly therepast during the power stroke of FIG. 4. Both the water and alkali metal injected into the chamber C absorb heat generated in the chamber and maintains the temperature of the engine parts within operable limits.

Figure 6:
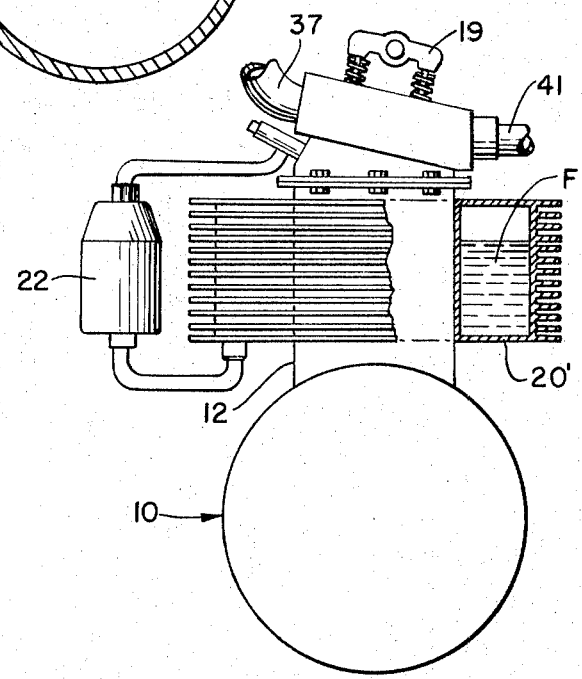
FIG. 6 is a view of a portion of a modified engine.

In FIG. 6, a modification of the engine shown in FIG. 1 is illustrated and is substantially the same as the FIG. 1 embodiment except that the reservoir 20' for containing the fuel F is disposed in surrounding relationship to the cylinder 12, and the heat generated during the reaction of the water and alkali metal in the reaction chamber is utilized to maintain the fuel in a liquid condition. Of course, the fuel in the reservoir or tank 20' also serves to dissipate heat generated in the engine and maintains the parts of the engine within operable temperature limits.

If desired, a heater (not shown) such as used in diesel engines may be used to initially start the engine of the present invention. Once the engine is operating, all of the hydrogen produced when the alkali metal reacts with the water in the chamber C is burned.

Using gram molecular weights and sodium as a fuel F, 46 grams of sodium will react with 36 grams of water to produce 80 grams of sodium hydroxide and 2 grams of hydrogen. The hydrogen is burned in the reaction chamber to increase the work performed on the piston 14, and the sodium hydroxide and any steam are exhausted from the chamber. The steam may be condensed and the water recycled to the water storage tank 30, and the sodium hydroxide may be cycled directly from the reaction chamber into the crank case of the engine to lubricate the engine and thence into a storage chamber. Any sodium hydroxide exhausted to atmosphere from the storage tank or the engine will react with carbon monoxide present in the atmosphere to produce sodium bicarbonate.

The invention is applicable to any internal combustion engine design; and, in fact, the alkali metal and water can be reacted to produce a working fluid for driving a turbine or other external combustion engine design.

Thus, the present invention not only provides an engine which is non-polluting, but also enables a very simple design to be utilized for the engine thus reducing the cost of the engine, and the fuel and oxidant used for producing the working fluid in the engine are inexpensive.

As this invention may be embodied in several forms without departing from the spirit or essential characteristics thereof, the present embodiment is therefore illustrative and not restrictive, since the scope of the invention is defined by the appended claims rather than the description preceding them, and all changes that fall within the metes and bounds of the claims or that form their functional as well as conjointly cooperative equivalents, are therefore intended to be embraced by those claims.

What is claimed is:

1. An internal combustion engine utilizing as a working fluid therefor a liquid alkali metal reacted with water as an oxidant, said engine including a housing having a reaction chamber therein, means connected with the reaction chamber and with a source of fuel and water to supply metered amounts of a liquid alkali metal and water into the reaction chamber where the liquid alkali metal and water react violently to produce a working fluid which is ignited and expands in the reaction chamber, a driven member movably mounted in the reaction chamber and driven by the expanding working fluid, and a power output shaft connected with the driven member and driven thereby.

2. A combustion engine as in claim 1, wherein said reaction chamber comprises a cylinder, and said driven member comprises a piston reciprocable in the cylinder.

3. A combustion engine as in claim 2, wherein said engine includes a crankcase, said power output shaft comprising a crankshaft rotatable in said crankcase, and connecting rod means connected between said crankshaft and said piston.

4. A combustion engine as in claim 3, wherein a cylinder head is on the housing closing one end of the cylinder of the engine, intake and exhaust valves in said cylinder head for controlling the flow of air and water to the chamber of said engine and for controlling the flow of exhaust from said chamber, an injection nozzle in said head for injecting measured amounts of a liquid alkali metal into said chamber in timed relationship with the admission of air and water thereinto to react the alkali metal with the water in the chamber.

5. A combustion engine as in claim 4, wherein said alkali metal is contained in a reservoir, said reservoir mounted closely adjacent said cylinder so that heat generated in the cylinder during use of the engine maintains the alkali metal in liquid form.

6. A combustion engine as in claim 2, wherein said engine is a four cycle engine and said piston has an intake stroke, a compression stroke, a power stroke, and an exhaust stroke.

7. A combustion engine as in claim 4, wherein an intake manifold is connected to said cylinder head, a carburetor on said intake manifold, an air inlet in said carburetor, a water inlet in said carburetor, a conduit means connected to said water inlet and to a tank containing water for supplying water to said carburetor and thus to said engine, a tank containing a liquid alkali metal, conduit means connected to said tank and to said injection nozzle for supplying liquid alkali metal from said tank to said engine.

8. A combustion engine as in claim 6, wherein exhaust means is in said cylinder for exhausting an hydroxide of the reacted alkali metal from the chamber of the engine during a portion of the power stroke and exhaust stroke of said engine.

9. A combustion engine as in claim 7, wherein heater means is disposed in operative relationship with said tank containing alkali metal and said conduit means connected with said tank and with said injection nozzle for maintaining the alkali metal in liquid form.

10. A combustion engine as in claim 9, wherein conduit means is connected between said chamber and the crank case of said engine for conducting the hydroxide of the reacted alkali metal from the chamber into the crank case and thence into a storage tank, said hydroxide serving as a lubricant for said engine.

11. A combustion engine as in claim 10, wherein said alkali metal comprises sodium.

12. A combustion engine as in claim 10, wherein said alkali metal comprises lithium.

13. A combustion engine as in claim 10, wherein said alkali metal comprises potassium.

* * * * *